(12) United States Patent
Shargots et al.

(10) Patent No.: US 9,593,684 B2
(45) Date of Patent: Mar. 14, 2017

(54) PRESSURIZED WATER REACTOR WITH REACTOR COOLANT PUMPS OPERATING IN THE DOWNCOMER ANNULUS

(75) Inventors: Scott J. Shargots, Forest, VA (US); Mathew W. Ales, Forest, VA (US); Michael J. Edwards, Forest, VA (US); Randall J. Paliga, Lynchburg, VA (US)

(73) Assignee: BWXT Nuclear Energy, Inc., Charlotte, NC (US)

(*) Notice: Subject to any disclaimer, the term of this patent is extended or adjusted under 35 U.S.C. 154(b) by 640 days.

(21) Appl. No.: 13/192,735

(22) Filed: Jul. 28, 2011

(65) Prior Publication Data
US 2013/0028367 A1      Jan. 31, 2013

(51) Int. Cl.
*G21C 19/28*     (2006.01)
*G21C 15/00*     (2006.01)
(Continued)

(52) U.S. Cl.
CPC .............. *F04D 7/08* (2013.01); *G21C 1/086* (2013.01); *G21C 1/32* (2013.01); *G21C 15/243* (2013.01); *Y02E 30/32* (2013.01)

(58) Field of Classification Search
None
See application file for complete search history.

(56) References Cited

U.S. PATENT DOCUMENTS 3,325,374 A     6/1967 Margen
3,389,055 A     6/1968 Hughes
(Continued)

FOREIGN PATENT DOCUMENTS

CN     101154472     4/2008
DE     1564767 A1    1/1970
(Continued)

OTHER PUBLICATIONS

International Search Report and Written Opinion for PCT/US2012/046406 dated Dec. 7, 2012.
(Continued)

*Primary Examiner* — Marshall O'Connor
(74) *Attorney, Agent, or Firm* — Nelson Mullins Riley & Scarborough, LLP

(57) ABSTRACT

A pressurized water reactor (PWR) includes a vertical cylindrical pressure vessel and a nuclear reactor core disposed in a lower vessel section. A hollow cylindrical central riser is disposed concentrically inside the pressure vessel. A downcomer annulus is defined between the central riser and the pressure vessel. A reactor coolant pump (RCP) includes (i) an impeller disposed above the nuclear reactor core and in fluid communication with the downcomer annulus to impel primary coolant downward through the downcomer annulus, (ii) a pump motor disposed outside of the pressure vessel, and (iii) a drive shaft operatively connecting the pump motor with the impeller. The PWR may include an internal steam generator in the downcomer annulus, with the impeller is disposed below the steam generator. The impeller may be disposed in the downcomer annulus. The RCP may further comprise a pump casing that with the impeller defines a centrifugal pump.

17 Claims, 9 Drawing Sheets

(51) Int. Cl.
  *F04D 7/08* (2006.01)
  *G21C 1/08* (2006.01)
  *G21C 1/32* (2006.01)
  *G21C 15/243* (2006.01)

(56) References Cited

U.S. PATENT DOCUMENTS

| | | | |
|---|---|---|---|
| 3,947,154 A * | 3/1976 | Klepp | F04D 29/426 415/112 |
| 4,038,134 A | 7/1977 | Dorner et al. | |
| 4,039,377 A | 8/1977 | Andrieu et al. | |
| 4,057,467 A * | 11/1977 | Kostrzewa | G21C 1/322 376/285 |
| 4,072,563 A * | 2/1978 | McDonald | G21C 1/322 376/262 |
| 4,315,800 A | 2/1982 | Yoshimoto et al. | |
| 4,696,792 A | 9/1987 | Hobson | |
| 4,734,250 A | 3/1988 | Veronesi | |
| 4,859,885 A | 8/1989 | Kliman et al. | |
| 4,886,430 A | 12/1989 | Veronesi et al. | |
| 4,905,757 A | 3/1990 | Boardman et al. | |
| 5,053,190 A | 10/1991 | Garner et al. | |
| 5,073,335 A | 12/1991 | Townsend | |
| 5,082,620 A | 1/1992 | Fennern | |
| 5,089,218 A | 2/1992 | Gardner et al. | |
| 5,118,466 A | 6/1992 | Raymond et al. | |
| 5,124,115 A | 6/1992 | Dillmann | |
| 5,135,711 A | 8/1992 | Borchardt et al. | |
| 5,267,285 A | 11/1993 | Ekeroth et al. | |
| 5,295,171 A * | 3/1994 | Aburomia | F04D 9/06 376/370 |
| 5,465,280 A | 11/1995 | Wedellsborg | |
| 5,563,927 A | 10/1996 | Siegel et al. | |
| 5,583,900 A | 12/1996 | Kasahara et al. | |
| 5,642,011 A | 6/1997 | Fanning et al. | |
| 5,715,288 A | 2/1998 | Matteson | |
| 5,789,720 A | 8/1998 | LaGally et al. | |
| 5,935,439 A | 8/1999 | Hart et al. | |
| 6,091,791 A | 7/2000 | Matsumoto et al. | |
| 6,259,760 B1 * | 7/2001 | Carelli | G21C 1/086 376/346 |
| 6,504,888 B1 | 1/2003 | Fife et al. | |
| 6,546,066 B2 | 4/2003 | Baliga et al. | |
| 6,618,460 B2 | 9/2003 | Baliga et al. | |
| 6,769,262 B1 | 8/2004 | Gray | |
| 6,813,328 B2 | 11/2004 | Kitch et al. | |
| 6,888,908 B1 | 5/2005 | Klarner et al. | |
| 6,909,765 B2 | 6/2005 | Lahoda | |
| 7,139,359 B2 | 11/2006 | Baliga et al. | |
| 7,389,669 B2 | 6/2008 | Badlani et al. | |
| 7,567,645 B2 | 7/2009 | Baliga | |
| 8,590,419 B2 | 11/2013 | Finegan et al. | |
| 2004/0017877 A1 | 1/2004 | Hartel et al. | |
| 2004/0136488 A1 | 7/2004 | Tuite et al. | |
| 2005/0117684 A1 | 6/2005 | Klarner et al. | |
| 2005/0190877 A1 | 9/2005 | Knapp | |
| 2005/0199591 A1 | 9/2005 | Coe et al. | |
| 2010/0136181 A1 * | 6/2010 | Eggenreich et al. | 426/89 |
| 2010/0183113 A1 | 7/2010 | Ishida et al. | |
| 2010/0316181 A1 * | 12/2010 | Thome | F22B 1/023 376/372 |

FOREIGN PATENT DOCUMENTS

| | | |
|---|---|---|
| FR | 2719696 A1 | 11/1995 |
| GB | 1083862 A | 9/1967 |
| JP | S437272 Y | 4/1968 |
| JP | S53392 A | 1/1978 |
| JP | H0643275 A | 2/1994 |
| WO | 2009028562 | 5/2009 |

OTHER PUBLICATIONS

European Search Report dated Mar. 3, 2015 for EP Application No. 12841903.3.
Office Action dated Sep. 28, 2015 for Chinese Patent Application No. 201210046773.4.
Office Action dated Nov. 6, 2015 for Taiwan Patent Application No. 101126302.
Office Action dated May 17, 2016 for Japanese Patent Application No. 2014-522858.

* cited by examiner

PRESSURIZED WATER REACTOR WITH REACTOR COOLANT PUMPS OPERATING IN THE DOWNCOMER ANNULUS

BACKGROUND

The following relates to the nuclear reactor arts, electrical power generation arts, nuclear reactor control arts, nuclear electrical power generation control arts, thermal management arts, and related arts.

In nuclear reactor designs of the pressurized water reactor (PWR) type, a radioactive reactor core is immersed in primary coolant water at or near the bottom of a pressure vessel. The primary coolant is maintained in a compressed or subcooled liquid phase and is discharged out of the pressure vessel into an external steam generator, or alternatively an internal steam generator is located within the pressure vessel (sometimes called an "integral PWR" design). In either design, heated primary coolant water heats secondary coolant water in the steam generator to generate steam. An advantage of the PWR design is that the steam comprises secondary coolant water that is not exposed to the radioactive reactor core.

In a typical integral PWR design configuration, the primary coolant flow circuit is defined by a cylindrical pressure vessel mounted generally upright (that is, with the cylinder axis oriented vertically) and a hollow cylindrical central riser disposed concentrically inside the pressure vessel. Primary coolant flows upward through the reactor core where it is heated and rises through the central riser, discharges from the top of the central riser and reverses direction to flow downward back to the reactor core through a downcomer annulus defined between the pressure vessel and the central riser. This is a natural convection flow circuit that can be powered by heating caused by the reactor core and cooling of the primary coolant as it flows upward and away from the reactor core. However, for higher power reactors it is advantageous or necessary to supplement or supplant the natural convection with motive force provided by electromechanical reactor coolant pumps.

Most commercial PWR systems employ external steam generators. In such systems, the primary coolant water is pumped by an external pump connected with external piping running between the PWR pressure vessel and the external steam generator. This also provides motive force for circulating the primary coolant water within the pressure vessel, since the pumps drive the entire primary coolant flow circuit including the portion within the pressure vessel.

Fewer commercial "integral" PWR systems employing an internal steam generator have been produced. In existing PWR designs, a reactor coolant pump of the "glandless" type using in boiling water reactor (BWR) designs is adapted for use in the integral PWR. The pump is typically coupled into the pressure vessel at the bottom of the pressure vessel, near the reactor core, analogous to the arrangement in a BWR, or at the top of the vessel. Both arrangements are problematic. Coupling into the bottom of the vessel introduces vessel penetrations at low elevation, which could be problematic in the event of a loss of coolant accident (LOCA) involving these connections. Coupling into the top of the vessel is problematic because that region is typically already occupied by external control rod drive mechanism (CRDM) units and by an internal pressurizer or a welded connection with an external pressurizer, as well as by various instrumentation feedthroughs and so forth.

Disclosed herein are improvements that provide various benefits that will become apparent to the skilled artisan upon reading the following.

BRIEF SUMMARY

In one aspect of the disclosure, an apparatus comprises a pressurized water reactor (PWR) including a vertically oriented cylindrical pressure vessel comprising upper and lower vessel sections that are secured together. The cylindrical pressure vessel has a vertically oriented cylinder axis. A nuclear reactor core is disposed in the lower vessel section. A hollow cylindrical central riser is disposed concentrically with and inside the cylindrical pressure vessel. A downcomer annulus is defined between the hollow cylindrical central riser and the cylindrical pressure vessel. A reactor coolant pump (RCP) includes (i) an impeller disposed above the nuclear reactor core and in fluid communication with the downcomer annulus to impel primary coolant downward through the downcomer annulus, (ii) a pump motor disposed outside of the pressure vessel, and (iii) a drive shaft operatively connecting the pump motor with the impeller. In some embodiments the RCP is secured to the lower vessel section. In some embodiments the PWR further includes an internal steam generator disposed in the downcomer annulus, and the impeller of the RCP is disposed below the internal steam generator. In some embodiments the impeller is disposed inside the pressure vessel in the downcomer annulus to impel primary coolant downward through the downcomer annulus. For example the impeller may be disposed inside the pressure vessel above an overhang of the pressure vessel with the pump motor disposed outside of the pressure vessel below the overhang and with the drive shaft oriented vertically and operatively connecting the pump motor below the overhang with the impeller above the overhang. In some embodiments the RCP further includes inlet and outlet flanges connecting the pump inlet and outlet with the downcomer annulus, and the PWR further comprises an annular separator extending between the hollow cylindrical central riser and the pressure vessel to separate the downcomer annulus into upper and lower sections, wherein the upper downcomer annulus section is connected with the pump inlet via the inlet flange and the lower downcomer annulus section is connected with the pump outlet via the outlet flange. In some embodiments the impeller is disposed inside the pressure vessel in the downcomer annulus to impel primary coolant downward through the downcomer annulus, and the reactor coolant pump further comprises a pump casing containing the impeller wherein the pump casing is also disposed inside the pressure vessel in the downcomer annulus and the pump casing and the impeller cooperatively define a centrifugal pump.

In another aspect of the disclosure, an apparatus comprises a pressurized water reactor (PWR) including: a vertically oriented cylindrical pressure vessel comprising upper and lower vessel sections; a hollow cylindrical central riser disposed concentrically with and inside the cylindrical pressure vessel wherein a downcomer annulus is defined between the hollow cylindrical central riser and the cylindrical pressure vessel; a nuclear reactor core disposed in the lower vessel section; and a plurality of reactor coolant pumps (RCPs) spaced apart around the hollow cylindrical central riser and secured to the lower vessel section wherein each reactor coolant pump includes (i) an impeller disposed inside the pressure vessel in the downcomer annulus, (ii) a pump motor disposed outside of the pressure vessel, and (iii) a drive shaft operatively connecting the pump motor with the impeller. In some embodiments the downcomer annulus proximate to the plurality of impellers is shaped to define a common annular pump casing for the plurality of impellers that cooperates with the plurality of rotating impellers to impel primary coolant downward through the downcomer annulus. In some embodiments each RCP further comprises a casing disposed inside the pressure vessel in the downcomer annulus and cooperating with the impeller to define a centrifugal pump. In some embodiments the PWR further comprises a steam generator disposed in the downcomer annulus, and the impellers are disposed below the steam generator and above the nuclear reactor core.

In another aspect of the disclosure, an apparatus comprises a pressurized water reactor (PWR) including: a vertically oriented cylindrical pressure vessel comprising upper and lower vessel sections; a nuclear reactor core disposed in the lower vessel section; a hollow cylindrical central riser disposed concentrically with and inside the cylindrical pressure vessel wherein a downcomer annulus is defined between the hollow cylindrical central riser and the cylindrical pressure vessel; an annular separator that separates the downcomer annulus into upper and lower sections in fluid isolation from one another; and a plurality of reactor coolant pumps (RCPs) spaced apart around the hollow cylindrical central riser wherein the inlet of each RCP is connected with the upper downcomer section by an inlet flange and the outlet of each RCP is connected with the lower downcomer section by an outlet flange such that the RCP impels primary coolant from the upper downcomer annulus section into the lower downcomer annulus section. In some embodiments each RCP is supported by its inlet flange, its outlet flange, or both its inlet flange and its outlet flange, and each RCP includes a pump motor hanging vertically below the remainder of the RCP.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
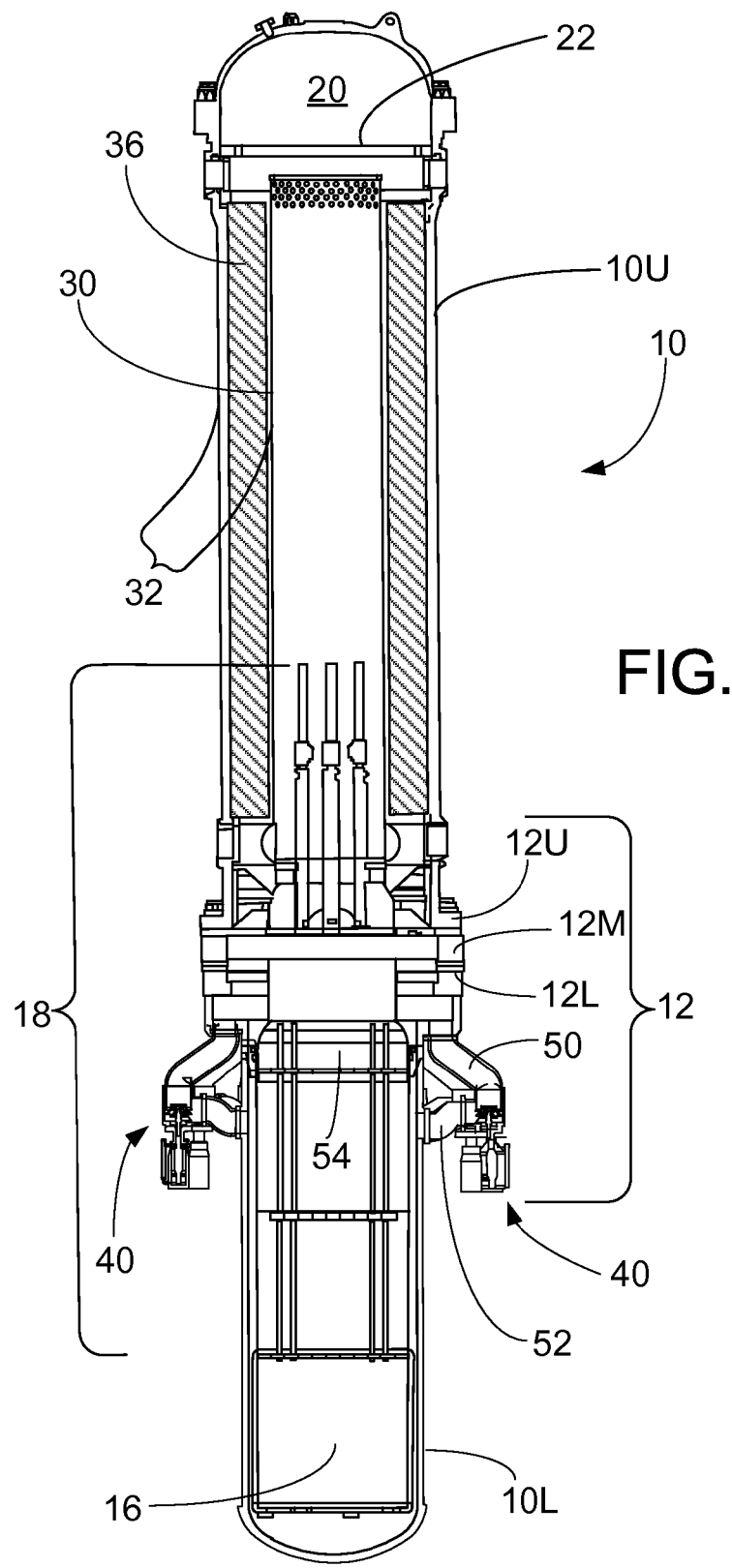
FIG. 1 diagrammatically shows a side sectional view of a pressurized water reactor (PWR) with reactor coolant pumps (RCPs).
Figure 2:
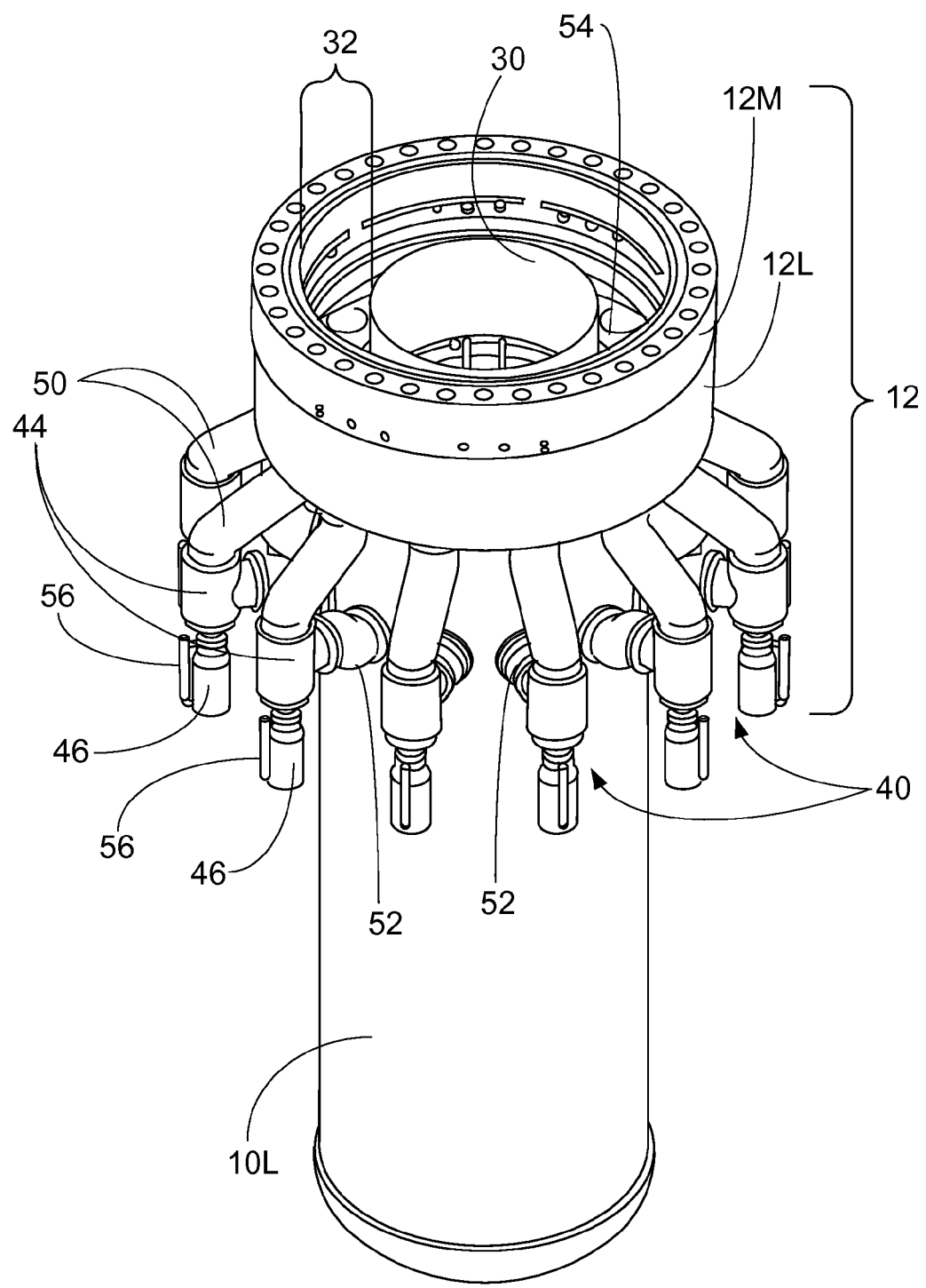
FIG. 2 diagrammatically shows a perspective view of the lower vessel of the PWR of FIG. 1 including the RCPs.
Figure 3:
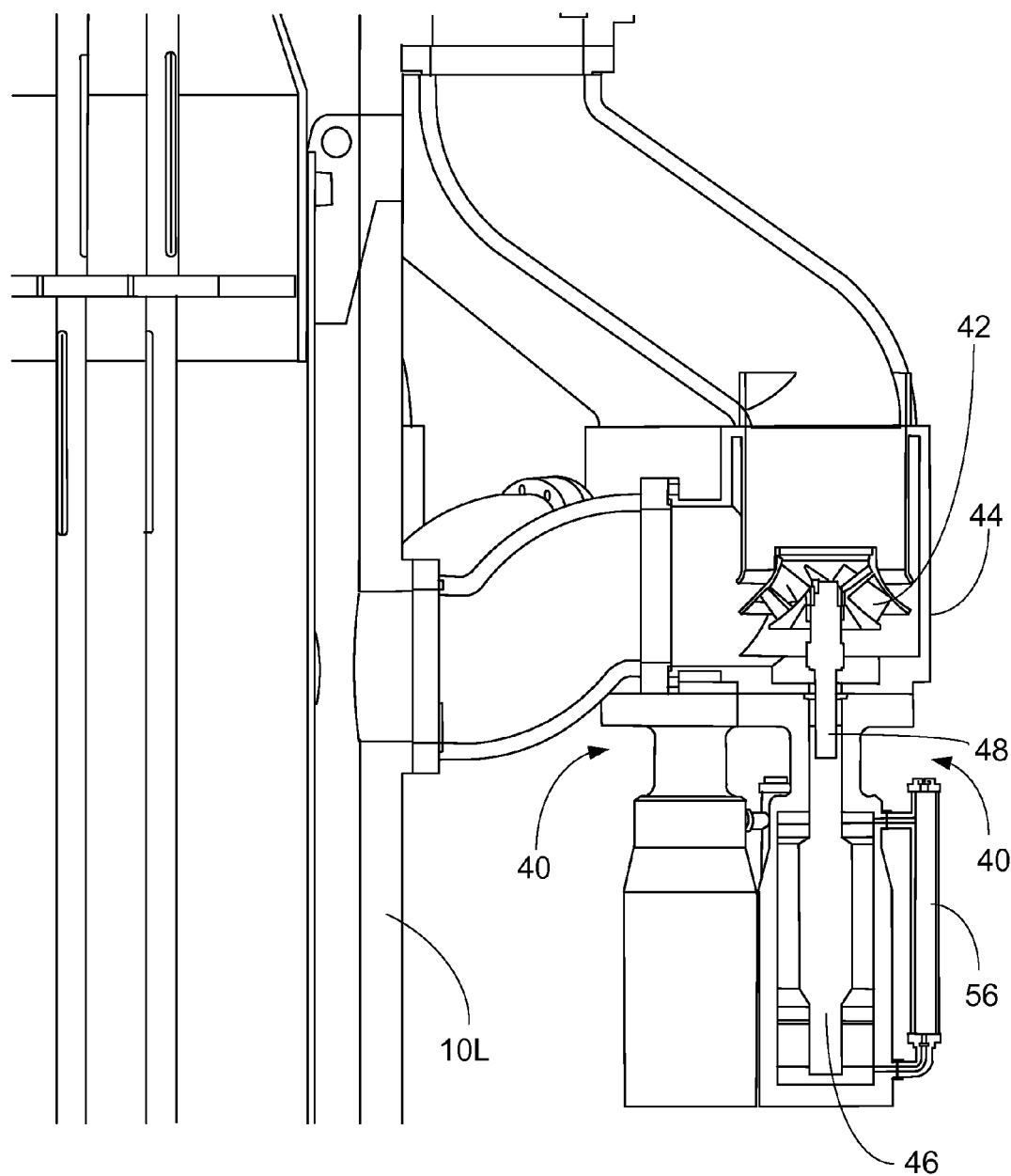
FIG. 3 diagrammatically shows a side sectional view of an enlarged portion of the lower vessel of the PWR of FIG. 1 including a sectioned RCP.

With reference to FIGS. 1-3, a pressurized water reactor (PWR) includes a cylindrical pressure vessel 10. As used herein, the phrase "cylindrical pressure vessel" indicates that the pressure vessel has a generally cylindrical shape, but may in some embodiments deviate from a mathematically perfect cylinder. For example, the illustrative cylindrical pressure vessel 10 has a circular cross-section of varying diameter along the length of the cylinder, and has rounded ends, and includes various vessel penetrations, vessel section flange connections, and so forth. The cylindrical pressure vessel 10 is mounted in an upright position and has an upper vessel section 10U and a lower vessel section 10L that are secured together at a mid-flange region 12 comprising a lower flange 12L forged with the lower vessel section 10L and an upper flange 12U forged with the upper vessel section 10U. The illustrative mid-flange region 12 further includes an intervening mid-flange element 12M, and the lower and upper flanges 12L, 12U are coupled to or through (e.g., with long-shank bolts) the mid-flange element 12M. Alternatively, the mid-flange element may be omitted and the lower and upper flanges 12L, 12U coupled directly together at the mid-flange region. Although the pressure vessel 10 is upright, it is contemplated for this upright position to deviate from exact vertical orientation of the cylinder axis. For example, if the PWR is disposed in a maritime vessel then it may be upright but with some tilt, which may vary with time, due to movement of the maritime vessel on or beneath the water.

The PWR further includes a diagrammatically indicated radioactive nuclear reactor core 16 disposed in the lower vessel section 10L. The reactor core 16 comprises a mass of fissile material, such as a material containing uranium oxide ($UO_2$) that is enriched in the fissile $^{235}U$ isotope, arranged fuel rod bundles or so forth disposed in a fuel basket or other support assembly configured to mount in suitable mounting brackets or retention structures of the lower pressure vessel section 10L (core mounting features not shown). Reactivity control is provided by a diagrammatically indicated control rod system 18, which typically comprises assemblies of control rods that are mounted on connecting rods, spiders, or other support elements. The control rods comprise a neutron absorbing material and the control rod assemblies (CRAs) are operatively connected with control rod drive mechanism (CRDM) units that controllably insert or withdraw the control rods into or out of the reactor core 16 to control or stop the chain reaction. As with the reactor core 16, the control rod system 18 is shown diagrammatically and individual components such as individual control rods, connecting rods, spiders, and CRDM units are not shown. The diagrammatically illustrated control rod system is an internal system in which the CRDM units are disposed inside the pressure vessel 10. Some illustrative examples of internal control rod system designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety. Alternatively, external CRDM units may be used—however, external CRDM units require mechanical penetrations through the top or bottom of the pressure vessel 10 to connect with the control rods.

In its operating state, the pressure vessel 10 of the PWR contains primary coolant water that serves as primary coolant and as a moderator material that thermalizes neutrons. The illustrative PWR includes an internal pressurizer 20 comprising an uppermost region of the upper vessel section 10L that contains a steam bubble and heaters, spargers, or other devices for heating or cooling the steam bubble. The internal pressurizer is separated from the remainder of the pressure vessel volume by a baffle plate 22 that transmits the pressure of the steam bubble (including adjustments made by the pressurizer heaters and/or spargers) to the remainder of the pressure vessel in order to control its pressure. Instead of the illustrative internal pressurizer 20, a separate external pressurizer can be provided that is connected with the pressure vessel 10 by suitable piping.

In a PWR the primary coolant water is maintained in a subcooled state. By way of illustrative example, in some contemplated embodiments the primary coolant pressure in the sealed volume of the pressure vessel 10 is at a pressure of about 2000 psia and at a temperature of about 300-320° C. Again, this is merely an illustrative example, and a diverse range of other subcooled PWR operating pressures and temperatures are also contemplated. The reactor core 16 is immersed in the primary coolant water, and the primary coolant water is heated by the radioactive chain reaction occurring in the nuclear reactor core 16. A primary coolant flow circuit is defined by a cylindrical central riser 30 disposed concentrically with and inside the cylindrical pressure vessel 10. Heated primary coolant water rises upward through the central riser 30 until it reaches the top of the riser, at which point it reverses flow and falls through a downcomer annulus 32 defined between the cylindrical central riser 30 and the cylindrical pressure vessel 10. At the bottom of the downcomer annulus 32 the primary coolant water flow again reverses and flows back upward through the nuclear reactor core 16 to complete the circuit.

In some embodiments, an internal steam generator 36 is disposed in the downcomer annulus 32. Secondary coolant water flows into the steam generator 36 via a feedwater inlet, optionally after buffering in a feedwater plenum, through the internal steam generator 36 where it is heated by proximate primary coolant in the downcomer annulus 32 and converted to steam, and out a steam outlet, again optionally after buffering in a steam plenum. (Details of the steam generator such as the feedwater inlet, and steam outlet, and buffering plenums are not shown in FIG. 1.) The output steam may be used for driving a turbine to generate electricity or for some other use (external plant features not shown). A PWR with an internal steam generator is sometimes referred to as an integral PWR, an illustrative example of which is shown in Thome et al., "Integral Helical Coil Pressurized Water Nuclear Reactor", U.S. Pub. No. 2010/0316181 A1 published Dec. 16, 2010 which is incorporated herein by reference in its entirety. While this publication discloses a steam generator employing helical steam generator tubes, other tube geometries including straight (e.g., vertical) once-through steam generator tubes, or recirculating steam generators, or U-Tube steam generators, or so forth are also contemplated.

In embodiments disclosed herein, circulation of the primary coolant water is assisted or driven by reactor coolant pumps (RCPs) 40. With particular reference to FIG. 3, each reactor coolant pump (RCP) 40 of the embodiment of FIGS. 1-3 includes: an impeller 42 disposed in a pump casing 44; a pump motor 46 disposed outside of the pressure vessel 10; and a drive shaft 48 operatively connecting the pump motor 46 with the impeller 42. Each RCP 40 of the embodiment of FIGS. 1-3 further includes separately forged inlet and outlet flanges 50, 52 connecting the pump inlet and outlet, respectively, with the downcomer annulus 32 in the mid-flange region 12. A annular separator 54 extends between the hollow cylindrical central riser 30 and the pressure vessel 10 to separate the downcomer annulus 32 into upper and lower sections. The inlet flange 50 connects the inlet of the RCP 40 to the upper downcomer annulus section while the outlet flange 52 connects the outlet of the RCP 40 to the lower downcomer annulus section. Accordingly, the RCP 40 impels primary coolant from the upper downcomer annulus section into the lower downcomer annulus section. Said another way, the upper and lower downcomer annulus sections are in fluid isolation from one another, except via the flanges 50, 52 and pump casing 44. During normal operation the RCP 40 actively drives primary coolant flow downward through the downcomer annulus, while if active cooling is interrupted by a power failure or other interruption then primary coolant can continue to undergo natural circulation through the path including the inlet flange 50, pump casing 44, and outlet flange 52.

More generally, in embodiments disclosed herein the RCPs are disposed in the mid-flange region 12 (e.g., typically above the nuclear reactor core 16 and below the internal steam generator 36, if present), pump primary coolant flowing through the downcomer annulus 32, and have pump motors 44 located externally, that is, disposed outside of the pressure vessel 10. This mid-flange positioning has certain advantages. A mid-flange placement is preferable to mounting the RCPs at the bottom of the vessel from the standpoint of emergency response to a LOCA. The mid-flange placement of the RCPs also places the RCPs relatively far away from the top of the pressure vessel 10, which alleviates space concerns since the mid-flange RCPs do not compete for space with other components such as the internal pressurizer 20. The mid-flange RCPs are also located relatively far away from primary coolant inflow into the reactor core 16 which occurs at the bottom of the pressure vessel 10. This distance allows any flow inhomogeneity introduced by action of the RCPs to dissipate so that inflow into the reactor core 16 is likely to have improved homogeneity as compared with PWR systems in which the RCPs couple into the pressure vessel at the bottom of the vessel. Still further, the pressure vessel is designed to separate at the mid-flange region 12 via the flanges 12L, 12U and optional intervening mid-flange element 12M. This provides ready access to the RCPs for maintenance purposes.

However, placement of the RCPs at the mid-flange region 12 presents numerous challenges. There are no support structures available for the external pump motors 44 at the mid-flange region. Moreover, mid-flange placement of the RCPs could interfere with downward primary coolant flow in the downcomer annulus 32, which in turn could interfere with emergency cooling safety systems that rely upon passive natural circulation within the pressure vessel in the event of a power interruption. In the case of an integral PWR, at least the upper portion of the downcomer annulus 32 is also occupied by the internal steam generator 36.

In the embodiment of FIGS. 1-3, these challenges are overcome as follows. Support for the pumps 40 is provided by the separately forged inlet and outlet flanges 50, 52 that connect the pump inlet and outlet, respectively, with the downcomer annulus 32 in the mid-flange region 12. Typically it is advantageous for maximum support and stability for both flanges 50, 52 to provide this support—however, it is alternatively contemplated to support the RCP primarily or entirely using only one of these flanges. In the illustrative embodiment the flanges 50, 52 and the casing 44 are shaped such that the drive shaft 48 is oriented vertically and the pump motor 46 is oriented vertically (that is, the rotor of the pump motor 46 rotates about a vertical axis). Such a vertical orientation reduces wear on the bearings that support the rotating elements (e.g., the rotor of the pump motor 46 and the driveshaft 48). Additionally, the vertically oriented pump motor 46 does not extend away from the pressure vessel 10 which reduces the amount of occupied space. This space occupation can be further reduced by making the lower vessel section 10L of smaller diameter than the upper vessel section 10U so that the lower vessel section 10L is effectively "recessed" providing space for the pump motors 46. Natural circulation in the event of interruption of operation of the RCPs 50 is maintained by the pathway comprising the inlet flange 50, pump casing 44, and outlet flange 52. This natural circulation path can be made of high fluid conductance by using sufficiently large-diameter flanges 50, 52, and/or by having a large number RCPs, and by constructing the pump casing 44 and the impeller 42 so as to present a low fluid flow resistance when the impeller 42 is not rotating.

Because the pump motor 46 is external to the pressure vessel 10, it does not experience the relatively high temperature of the PWR environment (e.g., about 300-320° C. in some embodiments, although higher or lower PWR operating temperatures are also contemplated). Nonetheless, some heat may be carried to the pump motor 46 by conduction through the flanges 50, 52 and pump casing 44, and/or by convection or radiation from the pressure vessel 10, and/or by heat carried to the RCP 40 by the pumped primary coolant. Accordingly, in some embodiments thermal management is provided for the pump motor 46, for example by providing a heat exchanger 56 in the illustrative embodiment.

In the embodiment of FIGS. 1-3, if there are N RCPs 40 spaced apart around the central riser 30 (e.g., at intervals of 360°/N) then there are 2N vessel penetrations: N penetrations for the inlet flanges 50 and N penetrations for the outlet flanges 52. These penetrations increase the complexity of the lower vessel section 10L, and introduce 2N additional components (i.e., N inlet flanges 50 and N outlet flanges 52), and introduce potential sites for a loss of coolant accident (LOCA). Placement of the RCPs 40 spaced apart from the pressure vessel 10 in the embodiment of FIGS. 1-3 simplifies access to the RCPs for maintenance.

Figure 4:
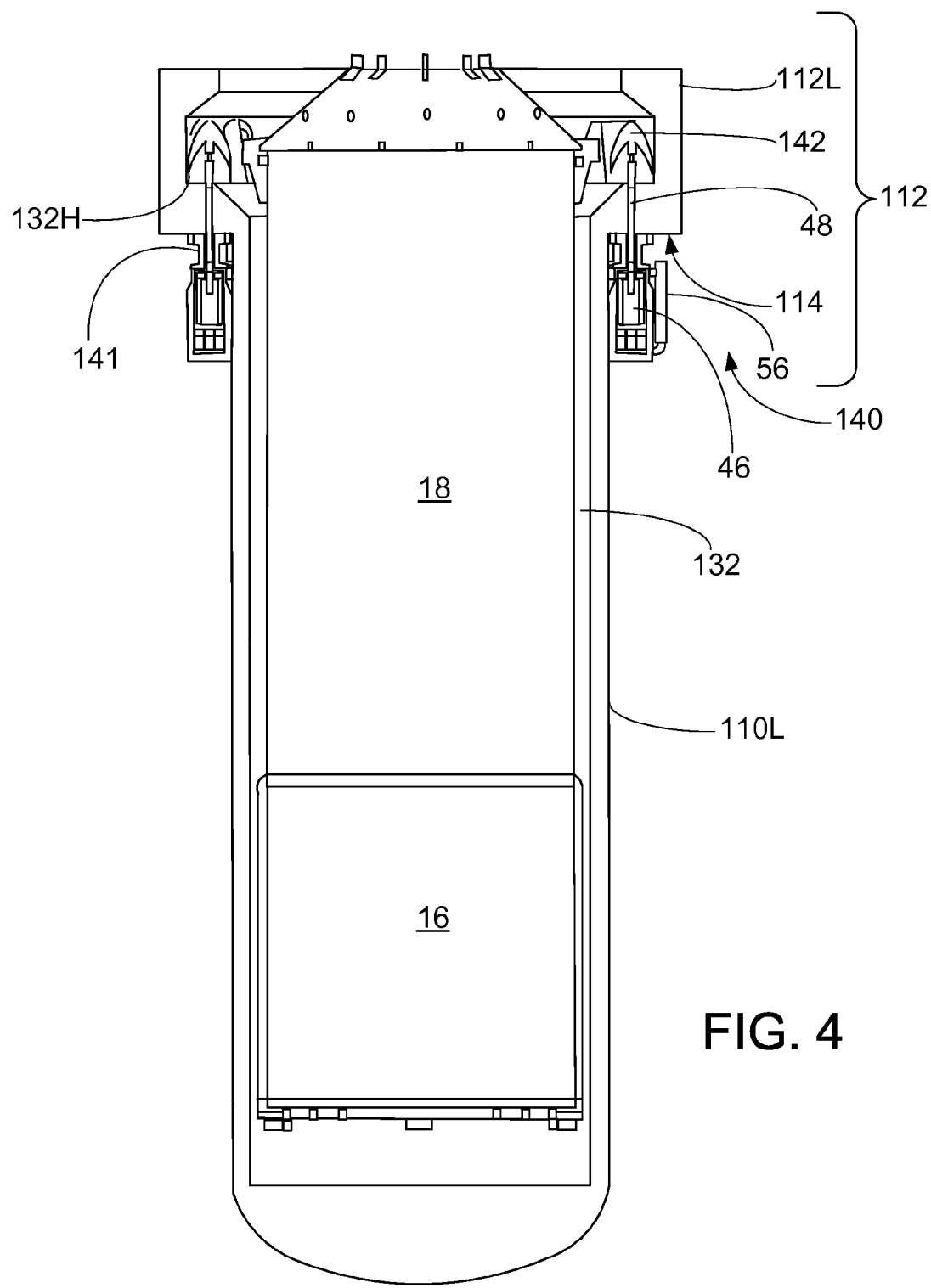
FIGS. 4 and 5 diagrammatically show side sectional and perspective views, respectively, of an alternative embodiment of the lower vessel of the PWR including alternative embodiment RCPs that do not include separately forged flanges.
Figure 5:
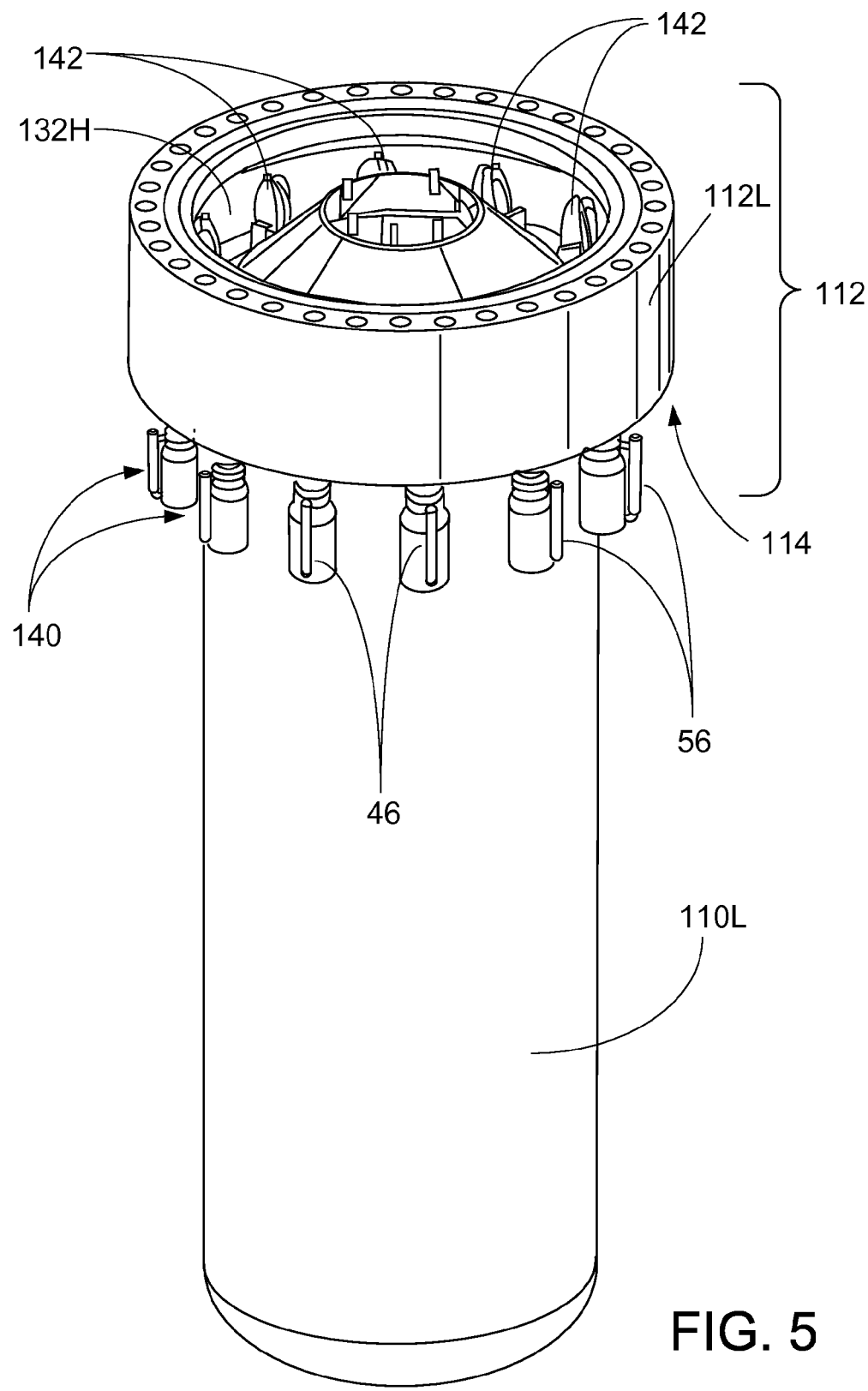
Figure 6:
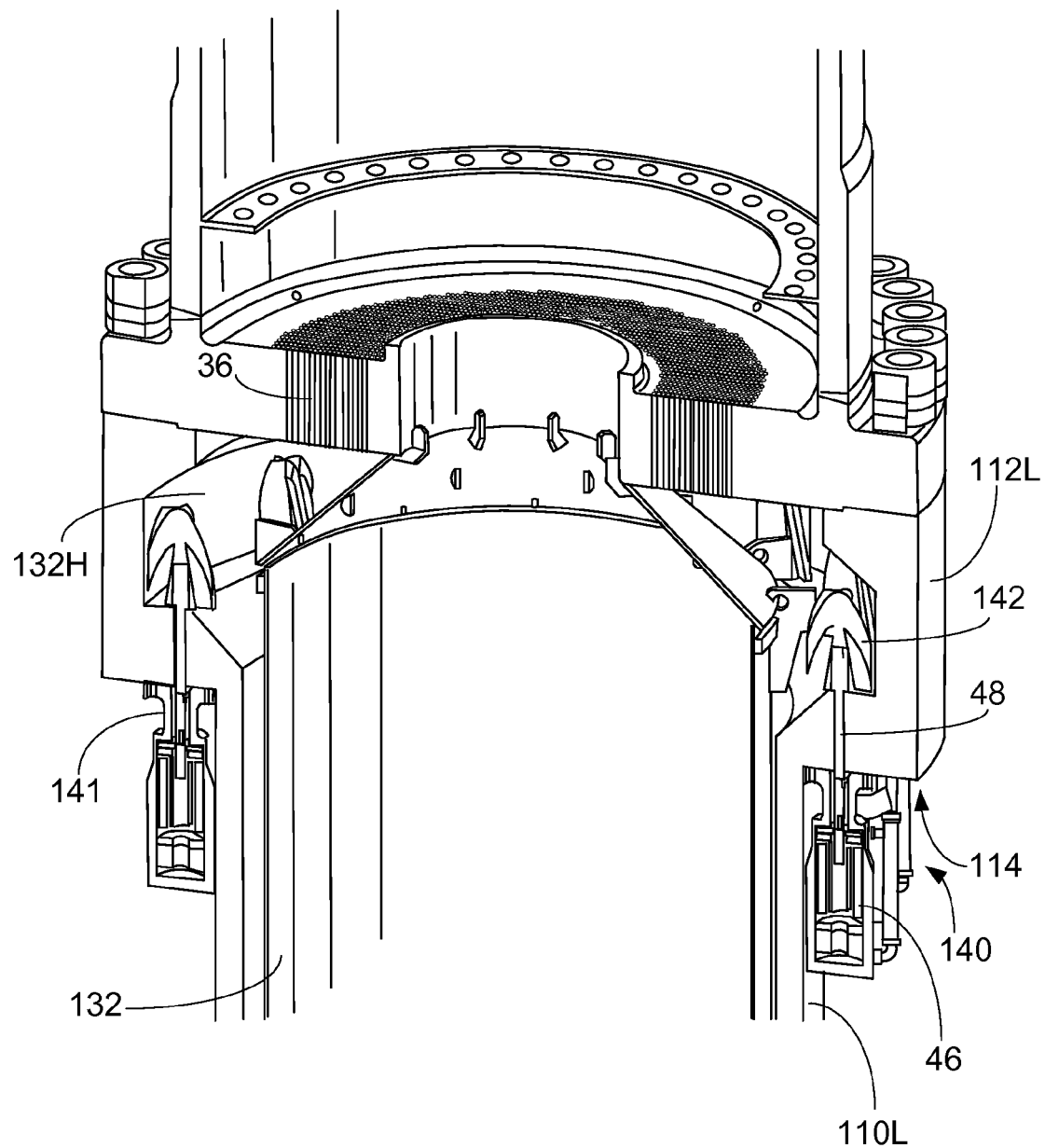
FIG. 6 diagrammatically shows a side sectional view of the mid-flange region of the PWR embodiment of FIGS. 4 and 5 including two sectioned RCPs.

With reference to FIGS. 4-6, in other embodiments the use of the inlet and outlet flanges 50, 52 is eliminated by disposing the impeller inside the pressure vessel in the downcomer annulus 32. In FIGS. 4 and 5, only a lower vessel 110L of this embodiment is shown, as this lower vessel 110L can connect with the same upper vessel 10U of FIG. 1 via a flange 112L of a mid-flange region 112 that is sized to mate with the flange 12U (and/or with the optional intervening mid-flange element 12M). The flange 112L is formed to define an overhang 114 of the pressure vessel, and more particularly of the lower vessel 110L. A reactor coolant pump (RCP) 140 includes the pump motor 46 cooled by heat exchanger 56 and the drive shaft 48 as in the embodiment of FIGS. 1-3. However, the dedicated pump casing 44 of the embodiment of FIGS. 1-3 is omitted in the embodiment of FIGS. 4-6, and instead an impeller 142 is disposed in a downcomer annulus 132. A portion of the downcomer annulus 132 proximate to the impeller 142 is shaped to define a pump casing 132H that cooperates with the impeller 142 to impel primary coolant downward through the downcomer annulus 132. For perspective, FIG. 6 shows the bottommost portion of the internal steam generator 36, showing the positioning of the impellers 142 above the reactor core 16 (see FIG. 4) and below the steam generator 36 (see FIG. 6). In the illustrative embodiment of FIGS. 4-6, the downcomer annulus 132 has a relatively smaller inner diameter in the upper vessel section (this inner diameter substantially coincides with the inner diameter of the steam generator 36 which is located in the upper vessel section with no portion of the steam generator in the lower vessel section 110L; see also the perspective view of FIG. 5 which shows the transition region) and a relatively larger inner diameter in the lower vessel section 110L. The impeller 142 of the RCP 140 is disposed inside the pressure vessel (and more particularly in the lower vessel section 110L) in a transition region of the downcomer annulus 132 over which the inner diameter of the downcomer annulus 132 transitions from the relatively smaller inner diameter to the relatively larger inner diameter. In the illustrative embodiment, this transition region also includes a flared portion formed into the lower vessel flange 112L that helps define the pump casing portion 132H of the downcomer annulus 132. Overall, the configuration of the downcomer annulus 132 proximate to the impellers 142 funnels the downward primary coolant flow toward the impellers 142 or otherwise manipulates that flow in order to enhance pumping efficiency, and thus effectively serves as a pump casing.

The embodiment of FIG. 4-6 advantageously has only N vessel penetrations for N RCPs 140, namely one vessel penetration per RCP 140. This vessel penetration allows the drive shaft 48 to pass through the overhang 114. In some embodiments, the vessel penetration is in the form of an opening in the pressure vessel that is sealed by an RCP flange on which the RCP 140 is mounted. In such embodiments the RCP 140 is installed as a unit, with the assembly comprising the pump motor 46, drive shaft 48, and impeller 142 already preassembled before installation onto the lower vessel section 110L. In these embodiments the opening in the pressure vessel at which the RCP 140 is installed must be large enough for the impeller 142 to pass through.

In alternative embodiments, the opening in the pressure vessel at which the RCP 140 is installed is not large enough for the impeller 142 to pass through, but rather is only large enough for the drive shaft 48 to pass through. In such embodiments, the pressure vessel opening includes a self-lubricating graphalloy bearing to provide a seal and to support the drive shaft 48 in the opening. In this approach, the pressure vessel openings are made small (i.e., just slightly larger than the diameter of the drive shaft 48) so as to minimize the likelihood and extent of a loss of coolant accident (LOCA) at these openings. In some contemplated embodiments, the openings may be 3 inches (7.62 cm) in diameter, or even smaller. A mounting flange 141 to which the pump motor 46 is secured suitably includes a metal gasket, o-ring, or other sealing element to provide further sealing additional to the sealing provided by the graphalloy bearing. In such embodiments, the impeller 142 is not installed through the opening via which the drive shaft 48 passes. Instead, the impeller 142 is accessible by separating the upper and lower vessel sections 10U, 110L, and the impeller 142 is installed via this access after the assembly including the drive shaft 48, pump motor 46, and mounting flange 141 is installed at the opening of the lower pressure vessel section 110L.

In the illustrative embodiments of both FIGS. 1-3 and FIGS. 4-6, the upper vessel section 10U has a larger diameter than the lower vessel section 10L, 110L. This helps define space for the inlet flange 50 in the embodiment of FIGS. 1-3, and provides a smooth profile into the flange 112L defining the overhang 114 in the embodiment of FIGS. 4-6. In both cases, the narrowing of the diameter from upper vessel section 10U to the lower vessel section 10L, 110L assists in shaping the primary coolant flow to be efficiently pumped by the RCP 40, 140. However, it is also contemplated for the upper and lower vessels can have a uniform (or more uniform) diameter across the mid-flange region 12, 112. In the case of an embodiment such as that of FIGS. 1-3 in which inlet and outlet flanges are provided, the smooth(er) diameter across the mid-flange region can be accommodated by suitable adjustments in the shape of the inlet and outlet flanges. In embodiments such as those of FIGS. 4-6 the smooth(er) diameter across the mid-flange region can be accommodated by suitable shaping of the pump casing defined into the downcomer annulus proximate to the impellers disposed inside the pressure vessel in the downcomer annulus.

In the illustrative embodiments of both FIGS. 1-3 and FIGS. 4-6, the drive shaft 48 is vertically oriented and the pump motor 46 is disposed below (or "hangs") below the impeller 42, 142, also oriented vertically. This symmetrical position respective to gravity advantageously reduces wear on the drive shaft 48 and pump motor bearings. It also provides a low profile for the pressure vessel with the RCPs 40, 140 installed, and facilitates removal of the pump motors for maintenance. The vertical orientation of the pump motor 46 also facilitates using existing reactor coolant pump motors commercially available for pumping boiling water reactor (BWR) systems, for which a vertical pump orientation is conventional.

In the embodiments of FIGS. 1-3 and 4-6, the impeller 42, 142 is positioned in the flow path inside the downcomer annulus 32, 132 without any casing other than the proximate downcomer annular which is shaped to serve the function of a casing. Accordingly, in the event of a power outage or other failure of the RCPs 40, 140 the natural circulation of primary coolant downward through the downcomer annulus 32, 132 is substantially unimpeded by the RCPs 40, 140. This facilitates the implementation of various passive emergency cooling systems that rely upon natural circulation in the event of a loss of electrical power for driving the RCPs 40, 140. Still further, the RCPs 40, 140 are also far away from the reactor core 16 and hence are unlikely to introduce flow turbulence in the core 16 (with its potential for consequent temperature variability).

Figure 7:
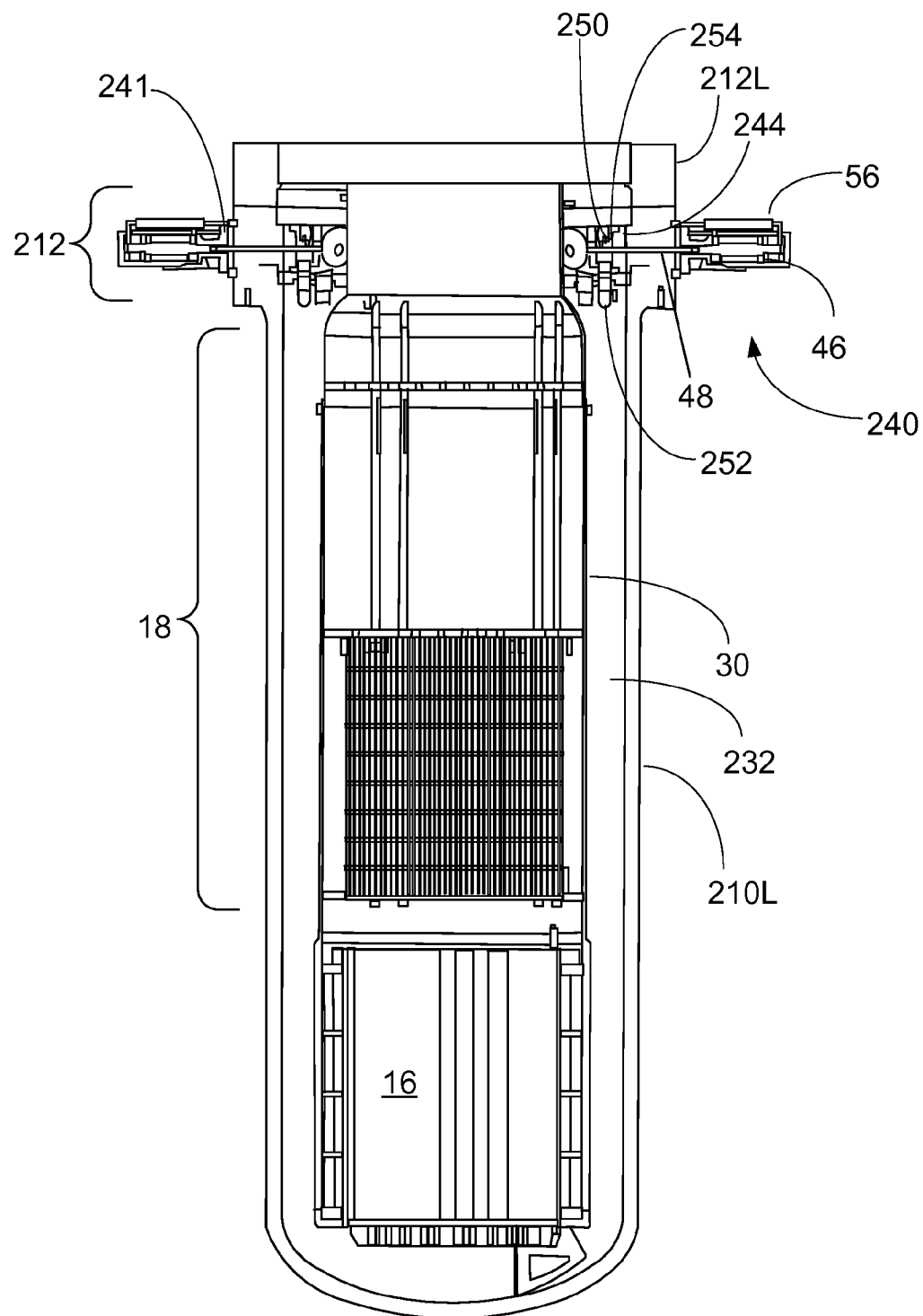
FIGS. 7 and 8 diagrammatically show side sectional and perspective views, respectively, of an alternative embodiment of the lower vessel of the PWR including alternative embodiment RCPs with centrifugal pump configurations and horizontally mounted motors.
Figure 8:
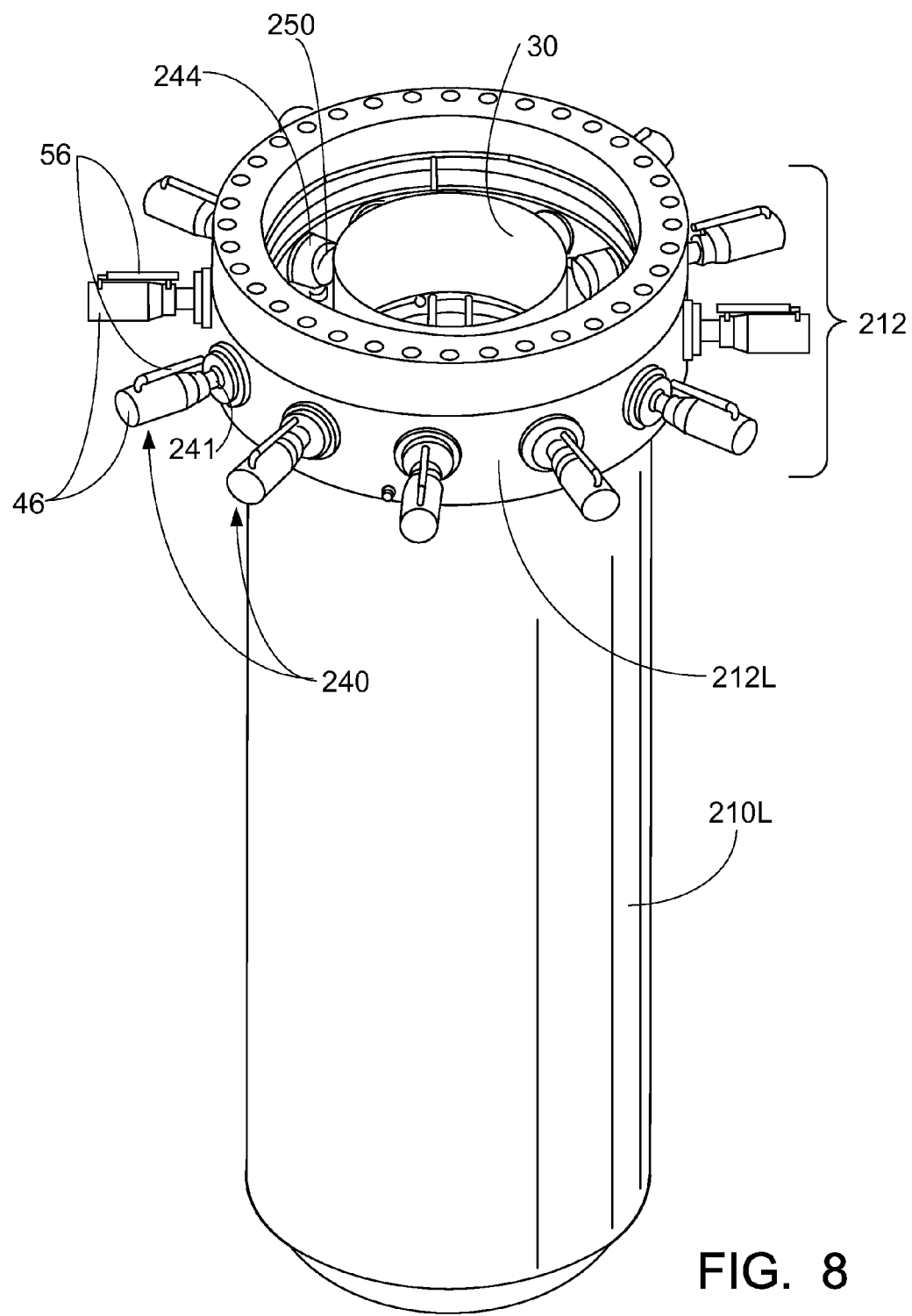
Figure 9:
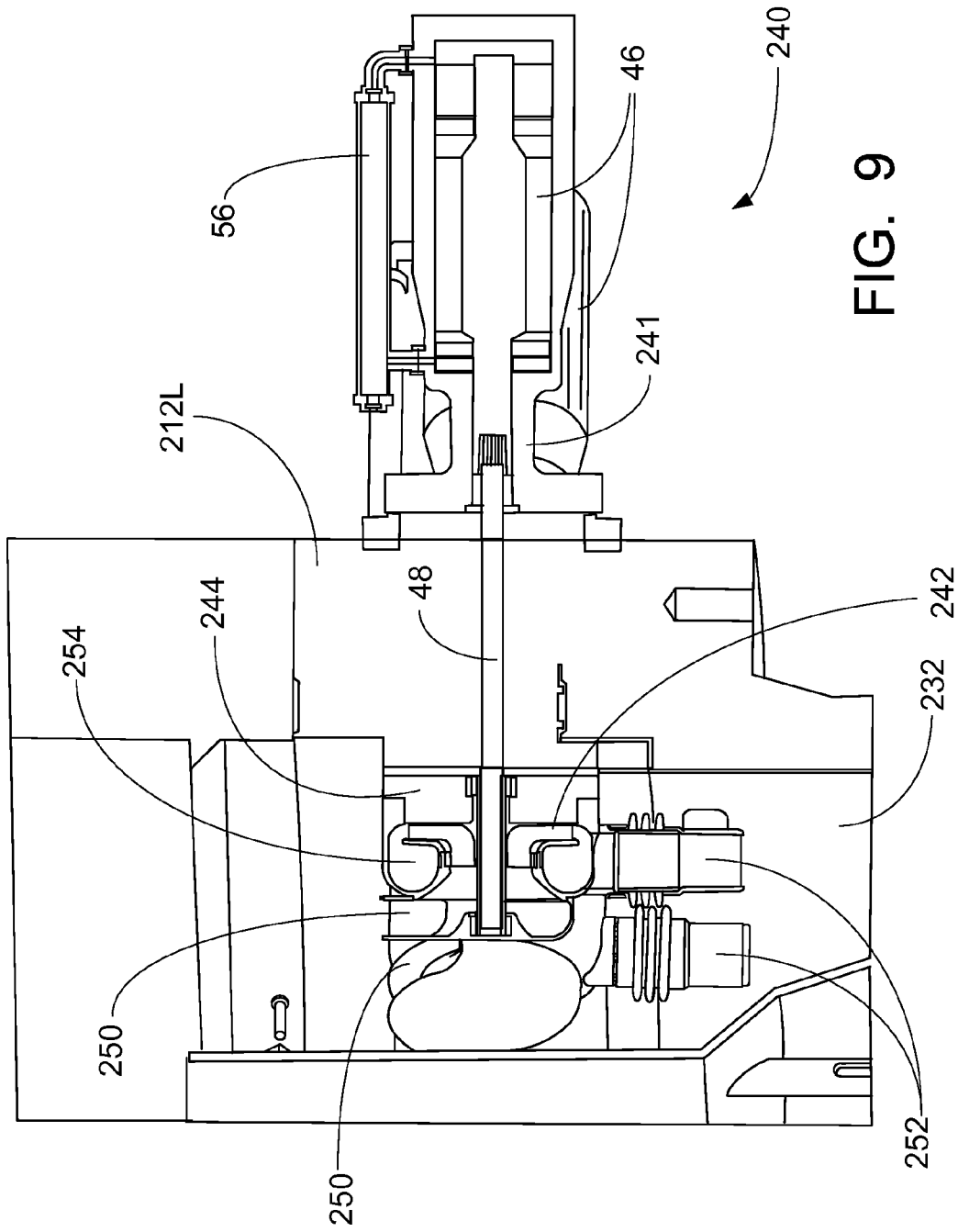
FIG. 9 diagrammatically shows a side sectional view of an enlarged portion of the lower vessel of the PWR of FIGS. 7 and 8 including a sectioned RCP.

With reference to FIGS. 7-9, in another embodiment an RCP 240 includes an impeller 242 disposed in a pump casing 244, both of which are disposed in a downcomer annulus 232 of a lower vessel section 210L at a lower flange 212L of a mid-flange region 212. In FIGS. 7 and 8, only the lower vessel 210L of this embodiment is shown, as this lower vessel 210L can connect with the same upper vessel 10U of FIG. 1 via the flange 212L which is sized to mate with the flange 12U (and/or with the optional intervening mid-flange element 12M).

Each RCP 240 further includes the pump motor 46 disposed outside of the pressure vessel 10 (optionally cooled by the heat exchanger 56 or another thermal management sub-system) and the drive shaft 48 operatively connecting the pump motor 46 with the impeller 242. However, in the embodiment of FIGS. 7-9 the pump motor 46 and the drive shaft 48 are both oriented horizontally, rather than vertically as in the embodiments of FIGS. 1-3 and 4-6. The impeller 242 and the pump casing 244 cooperatively define a centrifugal pump. The pump casing 244 includes an inlet 250 and an outlet 252 and defines a volute chamber 254. The impeller 242 operates in the volute chamber 254 to impel primary coolant from the inlet 250 through the volute chamber 254 to the outlet 252.

Because the embodiment of FIGS. 7-9 includes the pump casing 244 disposed inside the downcomer annulus 232, there is no need to specially shape the proximate region of the downcomer annulus 232 to define a casing. In the illustrative embodiment, the inner diameter of the downcomer annulus 232 does transition from a smaller inner diameter in the upper vessel section 10U to a larger inner diameter in the lower vessel section 210L at the location of the pump casing 244. This transition allows a larger space inside the central riser 30 for the control rod system 18 and nuclear reactor core 16, and also has the beneficial effect of funneling the downward primary coolant flow in the downcomer annulus 232 toward the inlets 250 of the centrifugal pumps which enhances pumping efficiency.

The pump motors 46 and drive shafts 48 are mounted horizontally in the embodiment of FIGS. 7-9. Accordingly, the opening in the pressure vessel (and more specifically in the lower pressure vessel section 210L at the flange 212L) is a horizontal opening rather than being located underneath overhang 114 as in the embodiment of FIGS. 4-6. The embodiment of FIGS. 7-9 does include an overhang introduced by the forged flange 212L, but this overhang does not have any commensurate structure in the downcomer annulus 232 of the embodiment of FIGS. 7-9. In some embodiments (not illustrated), the RCPs 240 are completely preassembled prior to mounting (including the centrifugal pump 242, 244 already mounted on the drive shaft 48 which is already secured to the pump motor 46 which is secured to a mounting flange) and this preassembled RCP is then mounted via the mounting flange at an opening in the lower vessel section that is large enough for the pump casing 244 to pass through.

Alternatively, as in the illustrative embodiment the opening can be sized smaller, being only large enough for the drive shaft 48 to pass through but not large enough for the pump casing 244 to pass through. In these (illustrated) embodiments, the assembly including the drive shaft 48 mounted to the pump motor 46 which is secured to a mounting flange 141 (but not including the centrifugal pump 242, 244) is mounted at the opening in the lower vessel section 210L. The opening suitably includes a graphalloy bearing to provide a seal and to support the drive shaft 48 in the opening. In this approach, the pressure vessel openings are made small (i.e., just slightly larger than the diameter of the drive shaft 48) so as to minimize the likelihood and extent of a loss of coolant accident (LOCA) at these openings. In some contemplated embodiments, the openings may be 3 inches (7.62 cm) in diameter, or even smaller. The mounting flange 241 to which the pump motor 46 is secured suitably includes a metal gasket, o-ring, or other sealing element to provide further sealing additional to the sealing provided by the graphalloy bearing. In such embodiments, the centrifugal pump 242, 244 is not installed through the opening via which the drive shaft 48 passes. Instead, the centrifugal pump 242, 244 is accessible by separating the upper and lower vessel sections 10U, 210L, and the centrifugal pump 242, 244 is installed via this access after the assembly including the drive shaft 48, pump motor 46, and mounting flange 241 is installed at the opening of the lower pressure vessel section 210L.

A further example of each illustrative embodiment is set forth in the following.

An example of the embodiment of FIGS. 1-3 suitably uses a conventional commercially available boiling water reactor (BWR)-style pump, in an arrangement that allows the pump motor 46 to hang below the impeller 42 in the mid-flange region 12 while complying with a desired maximum diameter for the assembled PWR (e.g., a 13 foot envelope in some embodiments, although a larger or smaller envelope is contemplated). This arrangement allows the pump hydraulics to be situated in a conventional fashion similar to the way they would be positioned in a BWR. The lower vessel section 10L has a reduced diameter as compared with the upper vessel section 10U, and includes a number of forged flanges protruding from it that mate with the pump inlet and discharge flanges 50, 52. The total number of forged flanges is twice the total number of pumps 40. Each RCP 40 includes a separate forging housing or casing 44 and includes the pump hydraulics (e.g., impeller 42), pump motor 46, and diffuser. This separately forged housing or casing 44 is bolted to the lower vessel forging 10L at the construction site where the operating PWR is to be located. In the illustrative embodiment of FIGS. 1-3 there are twelve RCPs 40, although more or fewer RCPs are contemplated.

An example of the embodiment of FIGS. 4-6 uses a conventional BWR style pump in an arrangement that allows the pump motor 46 to hang in the mid-flange region 112 below the impeller 142 without exceeding a desired maximum diameter for the assembled PWR (e.g., a 13 foot envelope in some embodiments, although a larger or smaller envelope is contemplated). The arrangement allows the pump hydraulics to be situated in a conventional fashion similar to the way they would be positioned in a boiling water reactor. The lower vessel section 110L has a reduced diameter as compared with the upper vessel section 10U which allows the RCPs 140 to be situated at the overhang 114 defined under the lower vessel flange 112L with the pump motors 46 below the overhang 114 and the impellers 142 above the overhang 114 inside the downcomer annulus 132. In the illustrative embodiment of FIGS. 4-6 there are twelve RCPs 140, although more or fewer RCPs are contemplated.

An example of the embodiment of FIGS. 7-9 uses a traditional BWR style pump in an arrangement that allows the pump motor 46 to be situated in a horizontal position in the mid-flange region 212. The arrangement utilizes centrifugal style pump hydraulics which is situated to allow the pump hydraulics to be internal to the pressure vessel while allowing the pump motor 46 to connect to the pump impeller 242. In the illustrative embodiment of FIGS. 4-6 there are twelve RCPs 240, although more or fewer RCPs are contemplated.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a pressurized water reactor (PWR) including:
   a vertically oriented cylindrical pressure vessel comprising upper and lower vessel sections that are secured together and having a cylinder axis of the cylindrical pressure vessel oriented vertically,
   a nuclear reactor core disposed in the lower vessel section,
   a hollow cylindrical central riser disposed concentrically with and inside the cylindrical pressure vessel wherein a downcomer annulus is defined between the hollow cylindrical central riser and the cylindrical pressure vessel, the downcomer annulus including (i) an upper portion with a relatively smaller inner diameter located in the upper vessel section, (ii) a lower portion with a relatively larger inner diameter located in the lower vessel section, and (iii) a transition region disposed between the upper portion and the lower portion, the inner diameter of the downcomer annulus transitioning in the transition region from the relatively smaller inner diameter of the upper portion to the relatively larger inner diameter of the lower portion, and
   a reactor coolant pump secured to the lower vessel section, the reactor coolant pump including (i) an impeller disposed above the nuclear reactor core and inside the pressure vessel in the transition region of the downcomer annulus to impel primary coolant downward through the downcomer annulus, (ii) a pump motor disposed outside of the pressure vessel, and (iii) a horizontally oriented drive shaft operatively connecting the pump motor with the impeller.

2. The apparatus of claim 1 wherein the upper vessel section has a larger diameter than the lower vessel section.

3. The apparatus of claim 1 wherein the lower vessel section includes an overhang at which the reactor coolant pump is secured with (I) the impeller disposed inside the pressure vessel in the downcomer annulus above the overhang and (II) the pump motor disposed outside the pressure vessel below the overhang.

4. The apparatus of claim 3 wherein the lower vessel section includes a flange by which the lower vessel section is secured with the upper vessel section, the flange having a larger diameter than the remainder of the lower vessel section so as to define the overhang at which the reactor coolant pump is secured.

5. The apparatus of claim 1 wherein the impeller is disposed inside the pressure vessel above an overhang of the pressure vessel and the pump motor is disposed outside of the pressure vessel below the overhang of the pressure vessel and the drive shaft operatively connects the pump motor below the overhang with the impeller above the overhang.

6. The apparatus of claim 1 wherein the downcomer annulus proximate to the impeller is shaped to define a pump casing that cooperates with the impeller to impel primary coolant downward through the downcomer annulus.

7. The apparatus of claim 1 wherein:
   the reactor coolant pump comprises a plurality of reactor coolant pumps including a corresponding plurality of impellers disposed in the downcomer annulus and spaced apart around the hollow cylindrical central riser, and
   the downcomer annulus proximate to the plurality of impellers is shaped to define an annular pump casing that cooperates with the plurality of impellers to impel primary coolant downward through the downcomer annulus.

8. The apparatus of claim 1 wherein the reactor coolant pump further comprises a pump casing containing the impeller, the pump casing also disposed inside the pressure vessel in the downcomer annulus, the pump casing and the impeller cooperatively defining a centrifugal pump with the pump casing defining the volute chamber of the centrifugal pump.

9. The apparatus of claim 8 wherein the reactor coolant pump is secured to the lower vessel section.

10. The apparatus of claim 1 wherein the impeller is accessible by separating the upper and lower vessel sections.

11. An apparatus comprising:
a pressurized water reactor (PWR) including:
a vertically oriented cylindrical pressure vessel comprising upper and lower vessel sections that are secured together and having a cylinder axis of the cylindrical pressure vessel oriented vertically,
a nuclear reactor core disposed in the lower vessel section,
a hollow cylindrical central riser disposed concentrically with and inside the cylindrical pressure vessel wherein a downcomer annulus is defined between the hollow cylindrical central riser and the cylindrical pressure vessel, the downcomer annulus including (i) an upper portion with a relatively smaller inner diameter located in the upper vessel section, (ii) a lower portion with a relatively larger inner diameter located in the lower vessel section, and (iii) a transition region disposed between the upper portion and the lower portion, the inner diameter of the downcomer annulus transitioning in the transition region from the relatively smaller inner diameter of the upper portion to the relatively larger inner diameter of the lower portion,
a reactor coolant pump including (i) an impeller disposed in the transition region of the downcomer annulus above the nuclear reactor core and in fluid communication with the downcomer annulus to impel primary coolant downward through the downcomer annulus, (ii) a pump motor disposed outside of the pressure vessel, and (iii) a horizontally oriented drive shaft operatively connecting the pump motor with the impeller, and
an internal steam generator disposed in the downcomer annulus, the impeller of the reactor coolant pump being disposed below the internal steam generator.

12. The apparatus of claim 11 wherein the impeller is disposed inside the pressure vessel in the downcomer annulus below the internal steam generator to impel primary coolant discharged from the internal steam generator downward through the downcomer annulus.

13. The apparatus of claim 11, wherein the internal steam generator is disposed entirely in the upper vessel section with no portion of the steam generator being disposed in the lower vessel section.

14. An apparatus comprising:
a pressurized water reactor (PWR) including:
a vertically oriented cylindrical pressure vessel comprising upper and lower vessel sections,
a hollow cylindrical central riser disposed concentrically with and inside the cylindrical pressure vessel wherein a downcomer annulus is defined between the hollow cylindrical central riser and the cylindrical pressure vessel, the downcomer annulus including (i) an upper portion with a relatively smaller inner diameter located in the upper vessel section, (ii) a lower portion with a relatively larger inner diameter located in the lower vessel section, and (iii) a transition region disposed between the upper portion and the lower portion, the inner diameter of the downcomer annulus transitioning in the transition region from the relatively smaller inner diameter of the upper portion to the relatively larger inner diameter of the lower portion,
a nuclear reactor core disposed in the lower vessel section, and
a plurality of reactor coolant pumps spaced apart around the hollow cylindrical central riser and secured to the lower vessel section wherein each reactor coolant pump includes (i) an impeller disposed inside the pressure vessel in the transition region of the downcomer annulus, (ii) a pump motor disposed outside of the pressure vessel, and (iii) a horizontally oriented drive shaft operatively connecting the pump motor with the impeller; and
a steam generator disposed in the downcomer annulus;
wherein the impellers are disposed below the steam generator and above the nuclear reactor core.

15. The apparatus of claim 14 wherein the downcomer annulus proximate to the plurality of impellers is shaped to define a common annular pump casing for the plurality of impellers that cooperates with the plurality of rotating impellers to impel primary coolant downward through the downcomer annulus.

16. The apparatus of claim 15 wherein the pressure vessel includes an overhang, the impellers of the reactor coolant pumps being disposed inside the pressure vessel above the overhang, the pump motors of the reactor coolant pumps being disposed outside of the pressure vessel below the overhang, and the drive shafts of the reactor coolant pumps being vertically oriented.

17. The apparatus of claim 14 wherein each reactor coolant pump further comprises a casing disposed inside the pressure vessel in the downcomer annulus and cooperating with the impeller to define a centrifugal pump with the pump casing defining the volute chamber of the centrifugal pump.

* * * * *